Feb. 15, 1955  L. O. WIESE  2,701,996
PLOWING AND CULTIVATING DISK
Filed Nov. 18, 1950
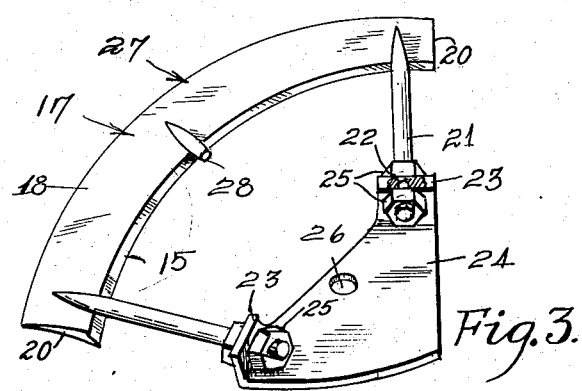
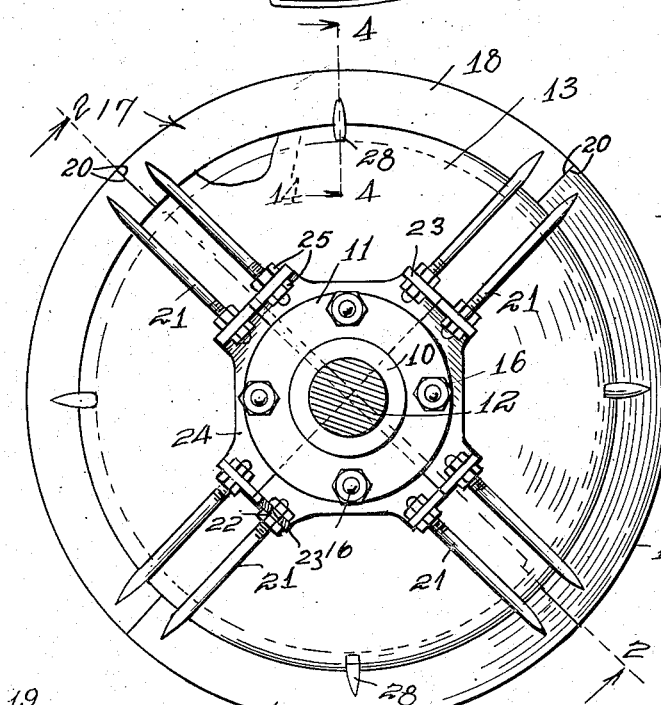
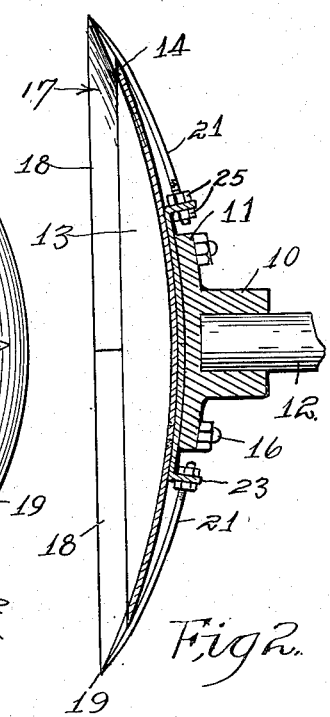
Inventor
Lee O. Wiese
by Alfred G. Hague
Atty ated on said plate between said lugs, and lock nuts on the threaded ends of said rods.

United States Patent Office 2,701,996
Patented Feb. 15, 1955

2,701,996
PLOWING AND CULTIVATING DISK
Lee O. Wiese, Perry, Iowa

Application November 18, 1950, Serial No. 196,367

3 Claims. (Cl. 97—217)

This invention relates to an improved disc of the type adapted to be applied to the larger type of disc plows. The larger type of disc plows are often used in soils containing a large percentage of stones and sand that causes the cutting edge of the disc to become worn very rapidly, requiring that they be sharpened quite frequently causing the diameter of the disc to be rapidly reduced and eventually a new disc.

It is therefore the object of my invention to provide a disc having a renewable cutting edge which may be easily and quickly renewed by a user not skilled in plow repair.

A further object of my invention is to provide a renewable cutting edge for disc plows and the like of annular formation that is adapted to be detachably fixed to the periphery of a central disc portion, and when so attached to form a unitary disc element.

It is further the object of my invention to form the annular cutting element of a plurality of sections to facilitate more economical construction wherein the sections may be formed of substantially rectangular bars of steel rather than from circular punchings and wherein a damaged portion of the cutter may be repaired by replacing one of the cutter sections.

A further object of my invention is to provide an improved repair element for disc plows having improved means for detachably fixing the repair element to the central disc portion in a detachable manner by a person unskilled in the art of plow repair.

My invention consists in the construction, arrangement and combination of the various parts of the device whereby the objects contemplated and attained as hereinafter more fully set forth, pointed out in my claims and illustrated in the accompanying drawings, in which:

Figure 1 is a rear elevation of my improved disc showing the manner that it is mounted on a disc supporting flange. Figure 2 is a sectional view taken on the line 2—2 of Figure 1. Figure 3 is a perspective view of one of the detachable repair sections. Figure 4 is an enlarged detail sectional view taken on the line 4—4 of Figure 1.

Referring to Figures 1 and 2 of the drawings the numeral 10 indicates the hub portion of a disc plow support, such as is in common use, having a flange 11, the hub being carried by a suitable shaft 12. My improved disc comprises a central disc portion 13 having its periphery beveled outwardly and rearwardly to form a beveled edge 14, the central portion of said disc having openings 9 for receiving bolts 16 mounted in corresponding openings in the flange 11 to support the disc in operative position. The annular cutting edge 17 is preferably formed of a plurality of segmental sections 18, formed preferably by placing one edge of a rectangular bar of steel between forming rolls to provide a tapered or cutting edge 19 this will cause the bar to take the form of an arc, the arcuate section is then placed in a suitable forming die and given the proper dish or curvature with the ends 20 trimmed on lines radiating from a common center, so that when the sections are placed end to end they will form an annular cutting element. The inner edge of each section having a bevel 15. The inner edge of each section 18 is formed to fit the bevel 14 of the central disc 13 when placed in operative position as illustrated in Figures 1, 2, and 4, the sections being detachably fixed in position by radially mounted rods 21 one end of each rod being connected to the back face of a corresponding end of a section 18, preferably by welding. The inner end of each rod 21 is threaded and adapted to be passed through openings 22 formed in lugs 23 projecting from a substantially triangular plate 24, nuts 25 serve to adjustably fix the rods in said lugs. The edges 20 are preferably formed on radial lines so that said edges will adjoin when assembled, the body of the plate being slightly dished to fit the space between the flange 11 and the back of the disc 13 when assembled. An opening 26 is provided in each plate 24 to receive the bolts 16. In actual practice the salable unit would consist of the central disc 13 and four of the replaceable units 27 as shown in Figure 3, this number may be increased or decreased if so desired, depending on the diameter of the central disc, etc. In the application of my improved disc, the old worn disc may be removed and a new one substituted by removing the bolts 16, and mounting the new disc in place thereof with the plates 24 placed between the disc 13 and the flange 11 with the beveled edge 15 of the members 18 outside of the bevel 14 and the front side of the bolts adjacent to the back side of the disc 13, the bolts 16 are then placed in position with the disc 13, the plates 24 and the flange firmly secured together, the nuts 25 serve to adjust the rods radially and inwardly to draw the sections 18 inwardly causing the flange 14 to be wedged firmly between the flange 15 and the rods 21. One or more lugs 28 may be fixed to the back side of the central portion of the member 18 to provide further means for preventing forward and rearward vibration of the cutting section when in operation.

Thus it will be seen that I have provided an improved disc for plows and the like in which it is not necessary to purchase a new disc each time it becomes badly worn to such an extent that its diameter has been reduced so much that it is impractical and inoperative.

Instead of discarding the worn disc and replacing it with a new central portion, the beveled edge 14 may be ground to a diameter to fit the bevel 15 of the replacement unit, of so desired.

If one of the sections becomes damaged by engaging a rock or similar obstruction the damaged unit can be easily and quickly replaced without having to replace the entire annular cutting edge. By mounting the rods 21 near the ends of the section 18 the adjoining ends are held firmly against forward and backward vibration when in use.

I claim:

1. A replacement cutting edge for plow disc and the like comprising an arcuate and dished sector having front and back faces inclined one relative to the other from its inner edge to provide a sharp outer cutting edge, the inner edge being beveled rearward and outwardly, means for fixing said sector to the periphery of a disc comprising a plate having the shape substantially of a right angle triangle, each of its acute angles being provided with a laterally projecting lug, each lug having an opening for receiving the threaded and inner end of a radius rod, the outer end of said rod being fixed to the back face of a corresponding end of said sector, between the inner and outer edges of said sector to provide a V-shaped notch between said beveled edge and said rod, and lock nuts on the threaded end of said rods.

2. A tool for plowing and cultivation, comprising a central disc section having its front face concaved and its back face convexed with its peripheral edge beveled outwardly and rearwardly, an annular cutting member formed of a plurality of adjoining sectors, each sector having front and back faces inclined, one relative to the other from its inner edge to provide a sharp cutting edge, the inner edge being beveled rearwardly and outwardly, means for fixing the beveled edges of the central disc section and said sectors together, comprising an anchor plate having the shape substantially of a right angle triangle with each of its acute angles provided with a laterally projecting lug, each lug having an opening therein, a radius rod having its inner end supported in a corresponding one of said openings, the outer end of each end of said rods being fixed to the back face of a corresponding end of one of said sectors with a V-shaped notch formed between the beveled edge of said sector and said rod with the beveled edge of said disc mounted therebetween, a hub flange, and means for clamping the anchor plates between said hub flange and the central portion of said disc with their perpendicular edges adjacent.

3. A tool for plowing and cultivation, comprising a central disc section having its front face concaved and its back face convexed with its periphery beveled outwardly and rearwardly, an annular cutting member formed of a plurality of adjoining sectors, each sector having front and back faces inclined, one relative to the other from its inner edge to provide a sharp cutting edge, the inner edge being beveled rearwardly and outwardly, means fixing the beveled edges of the central disc sections and said sectors together, comprising an anchor plate having the shape substantially of a right angle triangle with each of its acute angles provided with a laterally projecting lug, each lug having an opening therein, a radius rod having its inner end supported in a corresponding one of said openings, the outer end of each of said rods being fixed to the back face of a corresponding end of one of said sectors with a V-shaped notch formed between the beveled edge of said sector and said rod with the beveled edge of said disc mounted therebetween, and means for clamping the anchor plates to the central portion of the back face of said disc section with their perpendicular edges adjacent.

References Cited in the file of this patent

UNITED STATES PATENTS

| | | |
|---|---|---|
| 1,049,030 | Adams | Dec. 31, 1912 |
| 1,256,225 | Harland | Feb. 12, 1918 |
| 1,707,426 | Baker | Apr. 2, 1929 |
| 2,187,443 | Beamer | Jan. 16, 1940 |
| 2,271,354 | Strandlund | Jan. 27, 1942 |